US008494756B2

(12) United States Patent
Zavala Jurado et al.

(10) Patent No.: US 8,494,756 B2
(45) Date of Patent: Jul. 23, 2013

(54) CONTROL SYSTEM AND METHOD BASED ON ESTIMATED ENGINE SPEED

(75) Inventors: Jose C. Zavala Jurado, Ann Arbor, MI (US); Lee C. Walker, Swartz Creek, MI (US)

(73) Assignee: GM Global Technology Operations LLC

( * ) Notice: Subject to any disclaimer, the term of this patent is extended or adjusted under 35 U.S.C. 154(b) by 486 days.

(21) Appl. No.: 12/859,564

(22) Filed: Aug. 19, 2010

(65) Prior Publication Data

US 2012/0046849 A1 Feb. 23, 2012

(51) Int. Cl.

*G06F 19/00* (2011.01)
*F02D 28/00* (2006.01)
*F02D 41/00* (2006.01)
*F02D 45/00* (2006.01)
*G01M 15/00* (2006.01)

(52) U.S. Cl.

USPC ........ 701/110; 701/102; 123/350; 73/114.25; 702/145; 702/187; 702/190

(58) Field of Classification Search

USPC .................. 123/350, 406.59, 406.61, 406.62; 701/101–103, 110, 111; 73/114.25, 114.26; 702/142, 145, 187, 189, 190

See application file for complete search history.

(56) References Cited

U.S. PATENT DOCUMENTS 5,043,900 A * 8/1991 Allen et al. .................. 701/102
5,157,965 A * 10/1992 Koegeler et al. ........... 73/114.15
5,241,480 A * 8/1993 Takaku et al. ................. 701/110
7,962,277 B2 * 6/2011 Hofmeister et al. .......... 701/110
8,131,452 B2 * 3/2012 Senda et al. .................. 701/110
2009/0234545 A1 9/2009 Stempnik et al.
2012/0078485 A1 * 3/2012 Verdejo et al. ................ 701/101
2013/0054121 A1 * 2/2013 Casoni et al. ................. 701/104

* cited by examiner

*Primary Examiner* — Willis R Wolfe, Jr.

(57) ABSTRACT

A control system includes a speed determination module and a profile estimation module. The speed determination module determines previous engine speeds based on a predetermined profile of a crankshaft position sensor and previous pulse times corresponding to teeth on the crankshaft position sensor. The profile estimation module performs data fitting to determine an estimated profile of the crankshaft position sensor based on the previous pulse times and the previous engine speeds. The speed determination module determines present engine speeds based on the estimated profile and present pulse times corresponding to the teeth on the crankshaft position sensor.

20 Claims, 5 Drawing Sheets

CONTROL SYSTEM AND METHOD BASED ON ESTIMATED ENGINE SPEED

FIELD

The present disclosure relates to control systems and methods for controlling a powertrain system based on an estimated engine speed.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine control module (ECM) and a transmission control module (TCM) may control an engine and a transmission, respectively, based on an engine speed. The engine speed may be determined based on a crankshaft position signal and a specified profile of a crankshaft position sensor. An actual profile of the crankshaft position sensor may differ from the specified profile. Inaccuracies in the specified profile may cause inaccuracies in the engine speed. In turn, the effectiveness of control by the ECM and the TCM may be reduced.

SUMMARY

A control system includes a speed determination module and a profile estimation module. The speed determination module determines previous engine speeds based on a predetermined profile of a crankshaft position sensor and previous pulse times corresponding to teeth on the crankshaft position sensor. The profile estimation module performs data fitting to determine an estimated profile of the crankshaft position sensor based on the previous pulse times and the previous engine speeds. The speed determination module determines present engine speeds based on the estimated profile and present pulse times corresponding to the teeth on the crankshaft position sensor.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
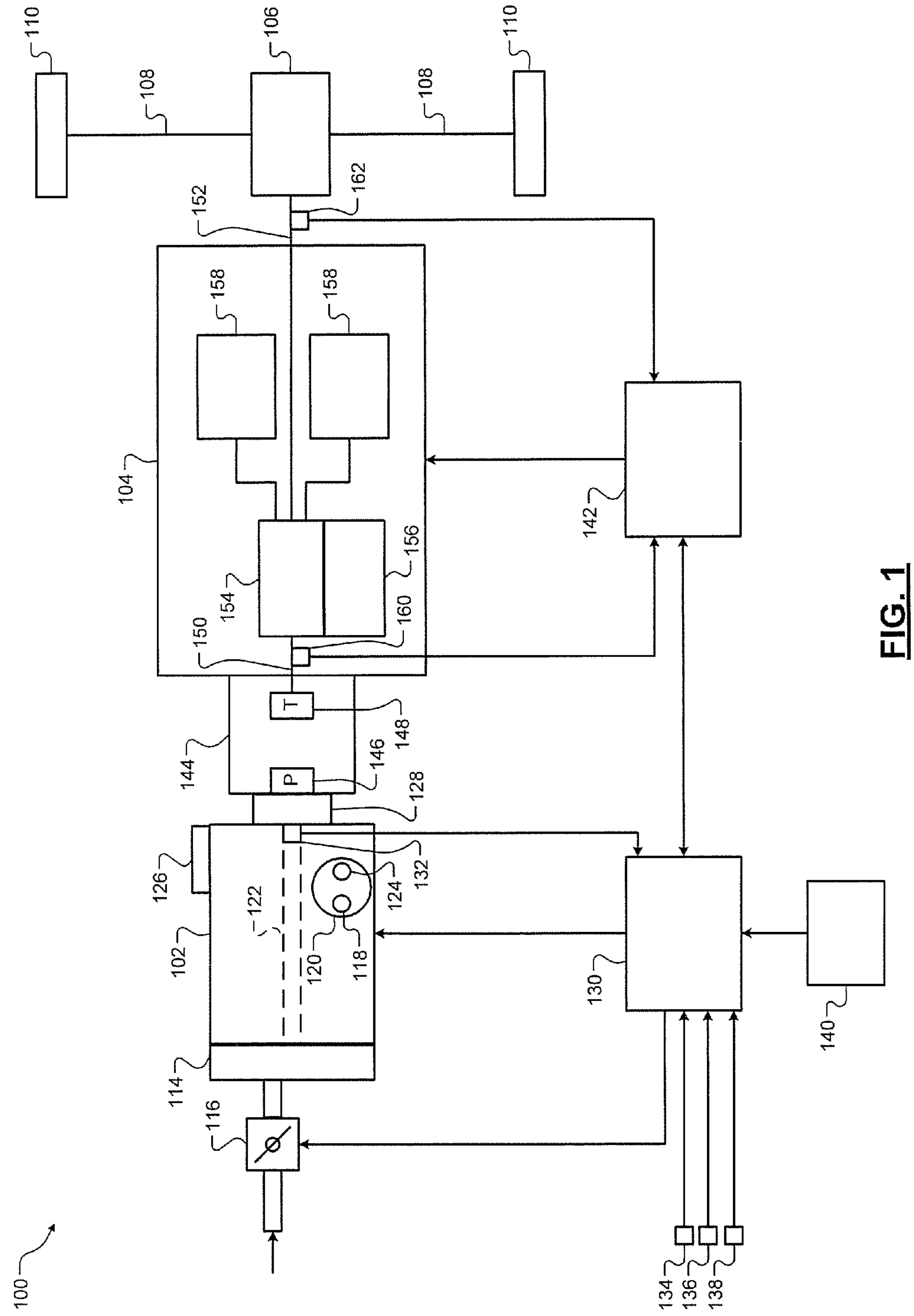
FIG. 1 is a schematic of an exemplary powertrain system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A control system and method according to the principles of the present disclosure monitors pulses of a crankshaft position signal corresponding to teeth on a crankshaft position sensor. Engine speeds are determined based on the pulse times and a predetermined profile of the crankshaft position sensor. An estimated profile of the crankshaft position sensor is obtained by performing data fitting, such as least squares, on the pulse times and the engine speeds. The engine speeds are adjusted based on the estimated profile, and an engine and/or a transmission are controlled based on the adjusted engine speeds.

Referring now to FIG. 1, a functional block diagram of an exemplary powertrain system 100 is presented. The powertrain system 100 includes an engine 102, a transmission 104, a differential 106, driveshafts 108, and drive wheels 110. The engine 102 generates drive torque for a vehicle. While the engine 102 is shown and will be discussed as a spark-ignition internal combustion engine (ICE), the engine 102 may include another suitable type of engine, such as a compression-ignition ICE. One or more electric motors (or motor-generators) may also generate drive torque, as discussed in more detail below.

Air is drawn into the engine 102 through an intake manifold 114. Airflow into the engine 102 may be varied using a throttle valve 116. One or more fuel injectors, such as a fuel injector 118, mix fuel with the air to form an air/fuel mixture. The air/fuel mixture is combusted within cylinders of the engine 102, such as a cylinder 120. Although the engine 102 is depicted as including one cylinder, the engine 102 may include more than one cylinder.

The cylinder 120 includes a piston (not shown) that is mechanically linked to a crankshaft 122. One combustion cycle within the cylinder 120 may include four phases: an intake phase, a compression phase, a combustion (or expansion) phase, and an exhaust phase. During the intake phase, the piston moves toward a bottommost position and draws air into the cylinder 120. During the compression phase, the piston moves toward a topmost position and compresses the air or air/fuel mixture within the cylinder 120.

During the combustion phase, spark from a spark plug 124 ignites the air/fuel mixture. The combustion of the air/fuel mixture drives the piston back toward the bottommost position, and the piston drives rotation of the crankshaft 122.

Resulting exhaust gas is expelled from the cylinder 120 through an exhaust manifold 126 to complete the exhaust phase and the combustion event. A flywheel 128 is attached to and rotates with the crankshaft 122. The engine 102 outputs torque to the transmission 104 via the crankshaft 122.

An engine control module (ECM) 130 controls the torque output of the engine 102 according to the principles of the present disclosure. A crankshaft position sensor 132 monitors rotation of the crankshaft 122 and outputs a crankshaft position signal based on rotation of the crankshaft 122. The ECM 130 uses the crankshaft position signal to determine the rotational speed of the crankshaft 122 (e.g., in revolutions per minute or RPM), which may be referred to as engine speed. The ECM 130 estimates a tooth profile of the crankshaft position sensor 132 by performing data fitting using the engine speed, and adjusts the engine speed based on the estimated profile. The ECM 130 may control the torque output of the engine 102 based on the adjusted engine speed.

The ECM 130 may control the torque output of the engine 102 based on one or more driver inputs, such as an accelerator pedal position (APP), a brake pedal position (BPP), and/or other suitable driver inputs. An APP sensor 134 measures position of an accelerator pedal (not shown) and generates an APP signal based on the position of the accelerator pedal. A BPP sensor 136 measures position of a brake pedal (not shown) and generates a BPP signal based on the position of the brake pedal.

A user may input vehicle startup and vehicle shutdown commands via an ignition switch 138. The ignition switch 138 receives input from the user and generates an ignition signal based on the input from the user. For example only, the user may input vehicle startup and vehicle shutdown commands by turning a key, pressing a button, or in another suitable manner. When a vehicle startup command is received, the ECM 130 may start the engine 102.

The powertrain system 100 may include one or more other engine sensors 140, such as a manifold absolute pressure (MAP) sensor, a mass air flowrate (MAF) sensor, an intake air temperature (IAT) sensor, an engine coolant temperature sensor, an engine oil temperature sensor, and/or other suitable sensors. The ECM 130 may control the torque output of the engine 102 based on parameters measured by the engine sensors 140. The ECM 130 may communicate with one or more other modules, such as a transmission control module (TCM) 142.

The transmission 104 is fluidly coupled to the engine 102 via a torque converter 144. The torque converter 144 includes a pump 146, a turbine 148, and a stator (not shown). A housing of the torque converter 144 is attached to and rotates with the flywheel 128. The pump 146 is attached to and rotates with the housing of the torque converter 144. The turbine 148 is fluidly coupled to the pump 146 and drives rotation of the transmission 104. The stator is disposed between the pump 146 and the turbine 148 and may be used to vary the torque transmitted through the torque converter 144.

The transmission 104 transfers drive torque from the torque converter 144 to the differential 106 at a desired gear ratio. The transmission 104 includes an input shaft 150, an output shaft 152, a gear train 154, friction elements 156, and one or more electric motors 158. The input shaft 150 drivingly couples the turbine 148 and the gear train 154. The output shaft drivingly couples the gear train 154 and the differential 106. The gear train 154 transmits torque from the input shaft 150 to the output shaft 152 at one or more gear ratios.

The gear train 154 also transmits torque from the electric motors 158 to the output shaft 152. The electric motors 158 may generate a positive torque to replace or supplement the torque output of the engine 102. The electric motors 158 may generate a negative torque to recharge batteries (not shown) that supply power to the electric motors 158. The electric motors 158 may also generate a negative torque to counteract torque pulses of the engine 102 during startup.

The differential 106 transfers drive torque from the output shaft 152 of the transmission 104 to the driveshafts 108. The driveshafts 108 may be referred to as half shafts. The driveshafts 108 drivingly couple the differential 106 to the driven wheels 110.

The TCM 142 receives inputs from various sources and controls the gear ratio at which the transmission 104 transfers drive torque based on the inputs received. The TCM 142 may receive inputs from sensors, such as an input shaft speed sensor 160 and an output shaft speed sensor 162. The input speed sensor 160 monitors rotation of the input shaft 150 and generates an input shaft speed signal based thereon. The output speed sensor 162 monitors rotation of the output shaft 152 and generates an output shaft speed signal based thereon.

The TCM 142 may also receive inputs from the ECM 130, such as the engine speed. The TCM 142 may control the electric motors 158 to minimize vibrations caused by torque pulses of the engine 102 during cranking. The TCM 142 may accomplish this by controlling the electric motors 158 to produce torque pulses in the opposite direction relative to the engine torque pulses. The opposing torque pulses are applied based on the engine speed. Thus, the effectiveness of this torque pulse cancellation depends on the accuracy of the engine speed.

Figure 2:
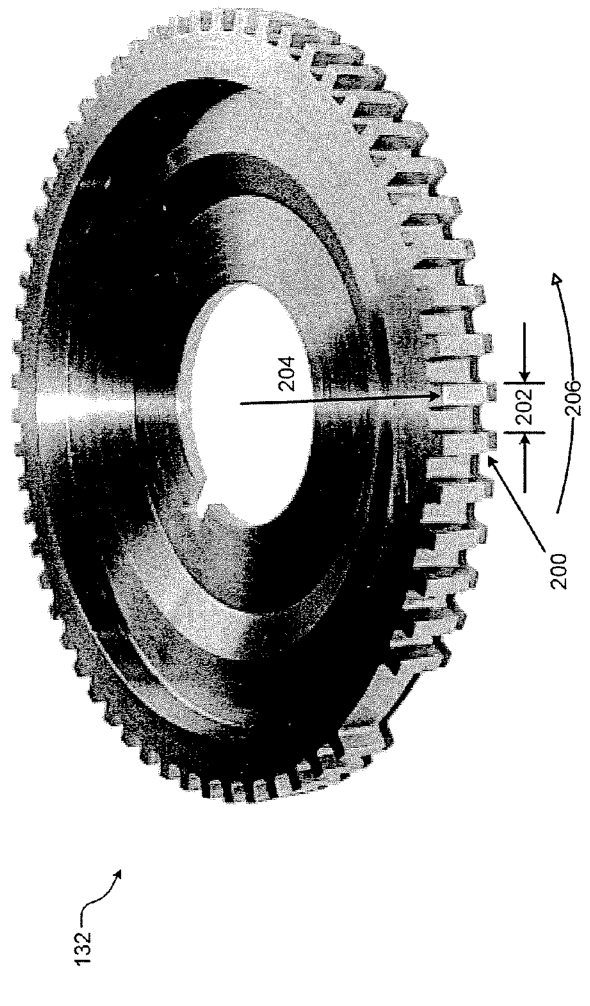
FIG. 2 illustrates an exemplary crankshaft position sensor.

Referring now to FIG. 2, a wheel of the crankshaft position sensor 132 is shown. The wheel has teeth and gaps between the teeth. The wheel may have 58 teeth, and each tooth may span approximately 3 degrees around the perimeter of the wheel. The gaps between most of the teeth may span approximately 3 degrees around the perimeter of the wheel, while the gap between the first tooth and the last tooth may span approximately 15 degrees.

An exemplary tooth 200 includes a leading edge and a trailing edge. The leading edge on the tooth 200 is separated from the leading edge on the preceding tooth by an arc length 202, which may be determined based on a predetermined angle between the leading edges and a radius 204 of the wheel. The tooth 200 travels at a velocity 206, which may be determined based on the arc length 202 and the times at which the leading edges are detected.

Figure 3:
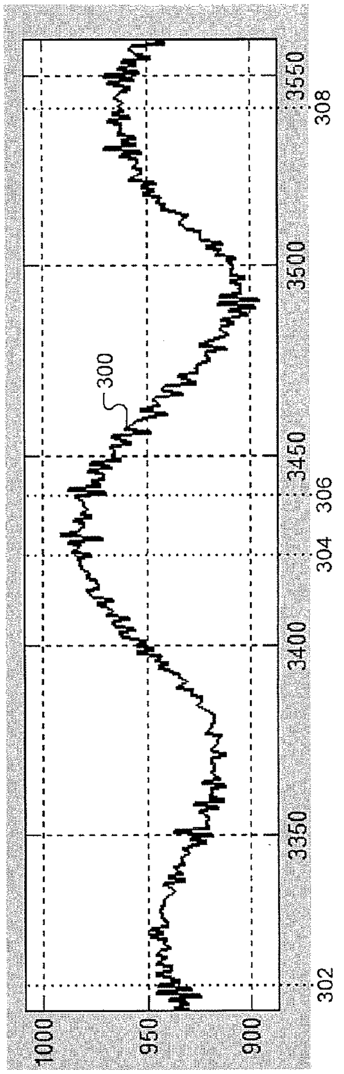
FIG. 3 illustrates an exemplary engine speed signal.

Referring now to FIG. 3, an exemplary engine speed signal 300 is illustrated. The x-axis represents time in milliseconds and the y-axis represents engine speed in RPM. The engine speed signal is generated based on detection of teeth on a wheel of a crankshaft position sensor. For illustration purposes, FIG. 3 shows the times at which two teeth, a first tooth and an $m_{th}$ tooth, are detected during two engine rotations. The first tooth and the $m_{th}$ tooth are detected at times 302 and 304, respectively, during an $n_{th}$ engine rotation. Teeth in between the first tooth and the $m_{th}$ tooth are detected at times between times 302 and 304 during the $n_{th}$ engine rotation. The first tooth and the $m_{th}$ tooth are detected at times 306 and 308, respectively, during an $n_{th+1}$ engine rotation. The teeth in between the first tooth and the $m_{th}$ tooth are detected at times between times 306 and 308 during the $n_{th+1}$ engine rotation.

Figure 4:
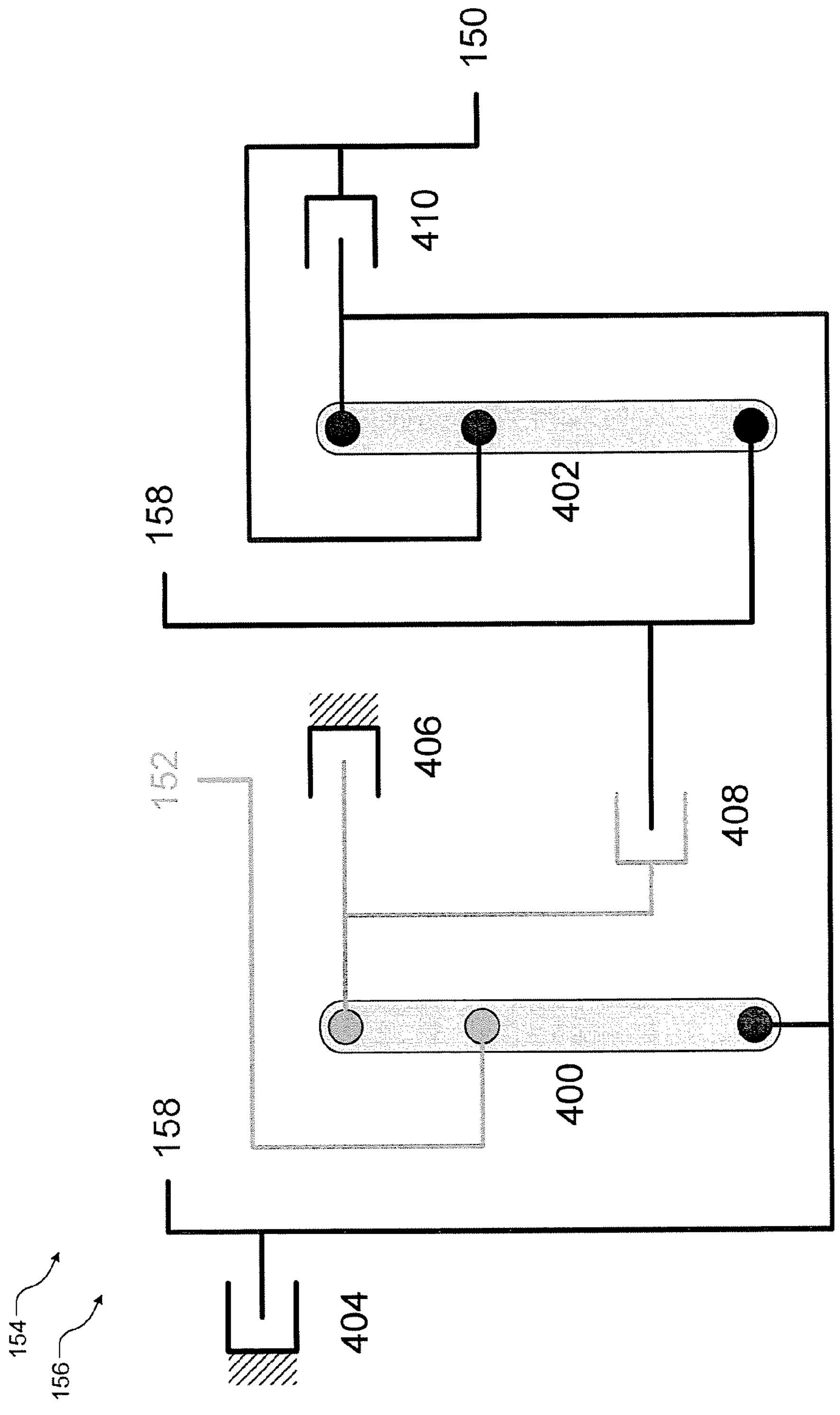
FIG. 4 is a schematic of an exemplary transmission.

Referring now to FIG. 4, a schematic of the gear train 154 and the friction elements 156 is shown. The gear train 154 includes gears 400, 402, and the friction elements 156 include clutches 404, 406, 408, and 410. The clutch 410 is applied to engage the input shaft 150 of the transmission 104 and the gear 402. The clutch 408 is applied to engage one of the electric motors 158 and the gear 402.

When the clutch 408 is applied, the clutch 406 is applied to engage the gear 402 and the gear 400. Since the gear 400 is coupled to the output shaft 152 of the transmission 104, applying the clutches 406, 408 engages the gear 402 and the output shaft 152. The clutch 404 is applied to engage a second one of the electric motors 158 with the gears 400, 402. When the clutch 410 is applied, applying the clutch 404 also engages the second one of the electric motors 158 and the input shaft 150 of the transmission 104.

Figure 5:
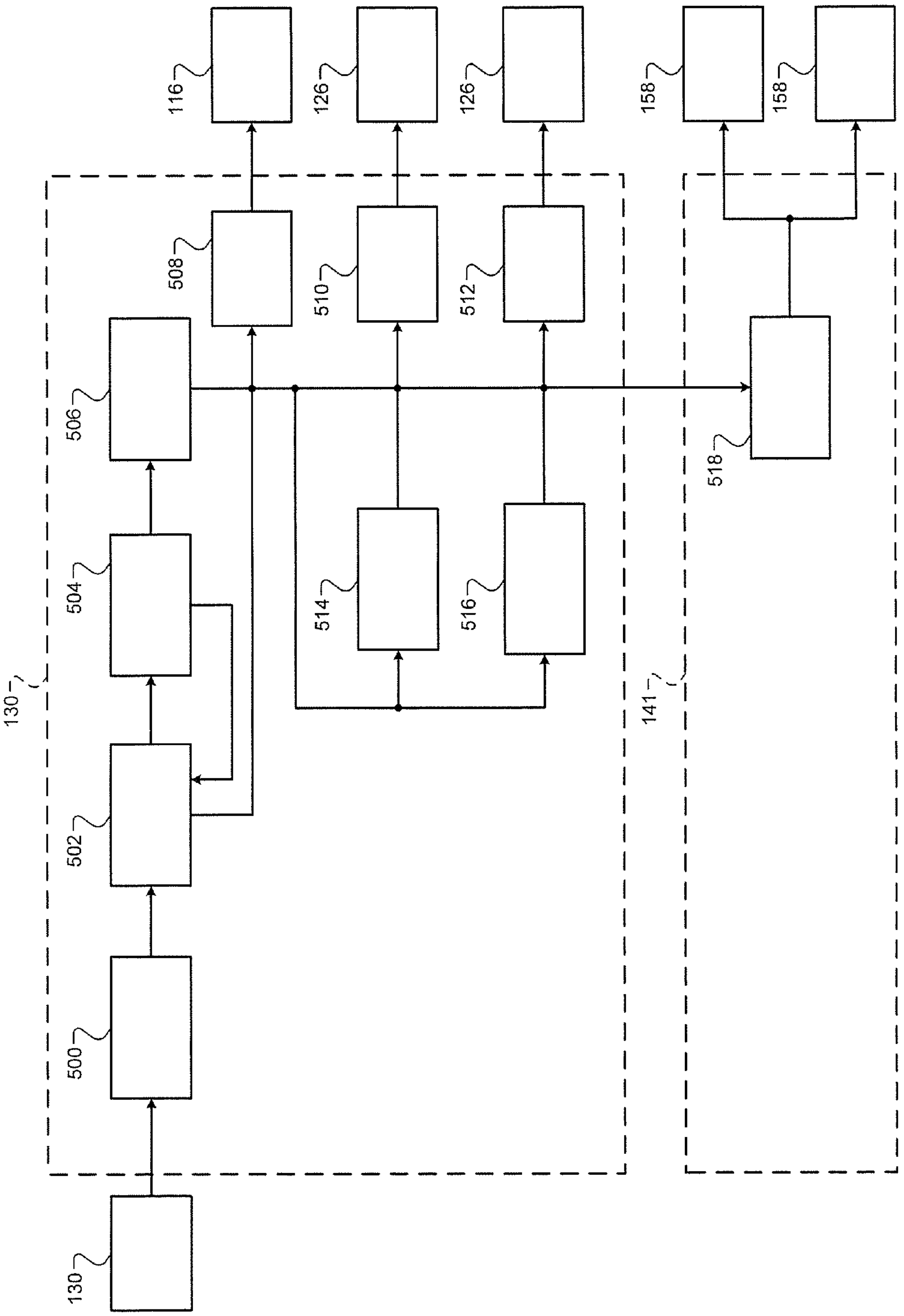
FIG. 5 is a functional block diagram of exemplary powertrain control modules according to the principles of the present disclosure.

Referring now to FIG. 5, the ECM 130 includes a crankshaft position filter module 500, an engine speed determination module 502, a sensor profile estimation module 504, and an engine speed correction module 506. The crankshaft position filter module 500 receives the crankshaft position signal from the crankshaft position sensor 132 and determines pulse times based thereon. The pulse times may be start times and/or end times of pulses in the crankshaft position signal indicating detection of teeth on the crankshaft position sensor 132. The pulse times may correspond to detection of leading edges and/or trailing edges of the teeth on the crankshaft position sensor 132.

The crankshaft position filter module 500 may filter the crankshaft position signal prior to determining pulse times based thereon. The crankshaft position filter module 500 may filter the crankshaft position signal using a low-pass filter or a band-pass filter. In addition, the crankshaft position filter module 500 may filter the crankshaft position signal using a frequency filter or an order filter. The frequency filter may be specified in hertz or oscillations per second. The order filter may be specified in oscillations per revolutions. The crankshaft position filter module 500 may output pulse times for at least two complete rotations of a wheel in the crankshaft position sensor 132.

The engine speed determination module 502 determines engine speeds based on the pulse times and a predetermined profile of the crankshaft position sensor 132. The predetermined profile includes predetermined spans, in angles, revolutions, or lengths, between the edges of the teeth yielding the pulse times. The engine speed determination module 502 may determine the engine speeds by dividing predetermined spans by the periods between the pulse times.

The sensor profile estimation module 504 performs data fitting using the engine speeds and the pulse times to obtain an estimated profile of the crankshaft position sensor 132. For example, the sensor profile estimation module 504 may form vectors representing the pulse times and the engine speeds, and then perform linear least squares to obtain the estimated profile. The estimated profile includes estimated spans, in angles, revolutions, or lengths, between the edges of the teeth yielding the pulse times. The estimated and predetermined profiles may be different due to manufacturing variation.

The engine speed correction module 506 adjusts the engine speeds determined by the engine speed determination module 502 based on the pulse times and the estimated profile. The engine speed correction module 506 may determine the adjusted engine speeds by dividing the pulse times by the estimated span between the edges of the teeth corresponding to the pulse times.

As additional pulse times are observed, the engine speed determination module 502 may determine additional engine speeds based on the estimated profile rather than the predetermined profile. The sensor profile estimation module 504 may adjust the estimated profile based on the additional engine speeds. The engine speed correction module 506 may adjust the additional engine speeds based on the adjusted estimated profile. The engine speed determination module 502 and the engine speed correction module 506 may output the engine speeds to various control modules, as discussed below.

The ECM 130 controls the throttle valve 116, the fuel injector 118, and the spark plug 124 via an air control module 508, a fuel control module 510, and a spark control module 512, respectively. More specifically, the ECM 130 controls opening of the throttle valve 116, fuel injection amount and timing, and spark timing. While not shown, the ECM 130 may also control other engine actuators, such as one or more camshaft phasers, an exhaust gas recirculation (EGR) valve, a boost device (e.g., a turbocharger or a supercharger), and/or other suitable engine actuators.

The engine speed determination module 502 and the engine speed correction module 506 may output engine speeds to the air control module 508, the fuel control module 510, and the spark control module 512. The air control module 508, the fuel control module 510, and the spark control module 512 may control the opening of the throttle valve 116 of FIG. 1, fuel injection amount and timing, and spark timing based on the engine speeds received.

The engine speed determination module 502 and the engine speed correction module 506 may also output engine speeds to an engine misfire detection module 514, an engine torque estimation module 516, and an electric motor control module 518. The engine misfire detection module 514 detects engine misfire based on the engine speeds. The engine torque estimation module 516 estimates engine torque based on the engine speeds. The electric motor control module 518 controls the electric motors 158 based on the engine speeds to counteract engine cranking torque pulses.

Figure 6:
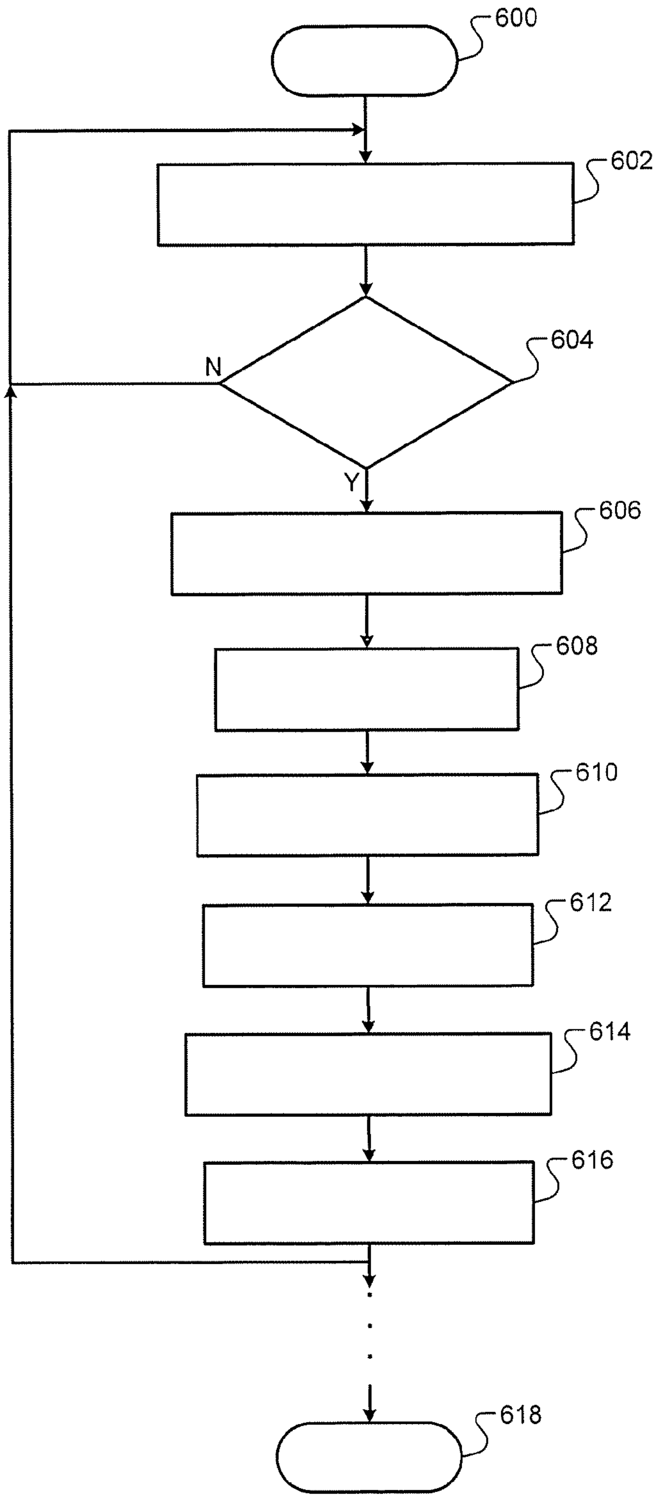
FIG. 6 is a flowchart illustrating an exemplary powertrain control method according to the principles of the present disclosure.

Referring now to FIG. 6, a method for estimating controlling a powertrain system based on an estimated engine speed is illustrated. At 600, the method begins. At 602, the method monitors a crankshaft position signal. The crankshaft position signal may include pulses that correspond to teeth on a crankshaft position sensor.

At 604, the method determines whether at least two engine rotations have been completed. If 604 is false, then the method returns to 602. If 604 is true, then the method filters the crankshaft position signal at 606. The method may filter the crankshaft position signal using a low-pass filter, a band-pass filter, a time-based filter, and/or a frequency-based filter.

At 608, the method determines pulse times based on the crankshaft position signal. The pulse times may be start times and/or end times of the pulses in the crankshaft position signal. The pulse times may correspond to leading edges and/or trailing edges of the teeth on the crankshaft position sensor.

At 610, the method determines engine speeds based on the pulse times and spans between the edges on teeth of the crankshaft position sensor corresponding to the pulse times. The spans may be predetermined based on a predetermined profile of a wheel of the crankshaft position sensor. Alternatively, the spans may be estimated based on an estimated profile of the crankshaft position sensor. The estimated profile may be based on previous engine speed determinations.

The method may use Equation 1, listed below, to form vectors representing the engine speeds. The vector on the left may correspond to the first tooth of FIG. 3 during n rotations ($v_{11}$ through $v_{1n}$), and the vector on the right may correspond to the $m_{th}$ tooth of FIG. 3 during the n rotations ($v_{m1}$ through $v_{mn}$).

$$\begin{bmatrix} v_{11} \\ v_{12} \\ v_{13} \\ \dots \\ v_{1n} \end{bmatrix} = \begin{bmatrix} \Delta x_{11}/\Delta t_{11} \\ \Delta x_{12}/\Delta t_{12} \\ \Delta x_{13}/\Delta t_{13} \\ \dots \\ \Delta x_{1n}/\Delta t_{1n} \end{bmatrix} \dots \begin{bmatrix} v_{m1} \\ v_{m2} \\ v_{m3} \\ \dots \\ v_{mn} \end{bmatrix} = \begin{bmatrix} \Delta x_{m1}/\Delta t_{m1} \\ \Delta x_{m2}/\Delta t_{m2} \\ \Delta x_{m3}/\Delta t_{m3} \\ \dots \\ \Delta x_{mn}/\Delta t_{mn} \end{bmatrix} \quad \text{Equation 1}$$

The tooth 200 of FIG. 2 may represent the $m_{th}$ tooth. The arc length 202 of FIG. 2 may represent spans between leading edges of the $m_{th}$ tooth and the preceding tooth during the n rotations ($\Delta x_{m1}$ through $\Delta x_{mn}$). The times 302, 306 of FIG. 3 may represent start times or end times of pulse periods corresponding to detection of the first tooth during the n rotations ($\Delta t_{11}$ through $\Delta t_{1n}$). The times 304, 308 of FIG. 3 may represent start times or end times of pulse periods corresponding to detection of the mth tooth during the n rotations ($\Delta t_{m1}$ through $\Delta t_{mn}$).

At 612, the method performs data fitting to estimate the spans between the edges of the teeth corresponding to the pulse times. The method may use Equation 2, listed below, to obtain the estimated spans.

$$x=(A^TA)^{-1}A^Ty \quad \text{Equation 2}$$

Equation 2 employs linear least squares to obtain the estimated spans between the teeth edges yielding the pulses. Vector y represents the periods between detection of the teeth edges. Vector A represents inverses of the engine speeds determined based on the periods between detection of the teeth edges and either predetermined spans or previously estimated spans. Vector x represents presently estimated spans between the teeth edges.

At 614, the method adjusts the engine speeds based on the presently estimated spans and the periods between detection of the teeth edges. The method may continue to determine engine speeds based on previously estimated spans, obtain presently estimated spans, and adjust the engine speeds based on the presently estimated spans. At 616, the method controls a powertrain, which may include an engine and/or one or more electric motors, based on the adjusted engine speeds. At 618, the method may end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:

a speed determination module that determines previous engine speeds based on a predetermined profile of a crankshaft position sensor and previous pulse times corresponding to teeth on the crankshaft position sensor; and a profile estimation module that performs data fitting to determine an estimated profile of the crankshaft position sensor based on the previous pulse times and the previous engine speeds, wherein the speed determination module determines present engine speeds based on the estimated profile and present pulse times corresponding to the teeth on the crankshaft position sensor.

2. The control system of claim 1, further comprising a speed correction module that determines adjusted engine speeds based on the previous pulse times and the estimated profile.

3. The control system of claim 1, wherein the profile estimation module forms vectors representing the previous pulse times and the previous engine speeds and performs linear least squares to determine the estimated profile.

4. The control system of claim 1, further comprising a crankshaft position filter module that filters a crankshaft position signal generated by the crankshaft position sensor to determine the previous pulse times.

5. The control system of claim 4, wherein the crankshaft position filter module applies one of a low-pass filter and a band-pass filter to determine the previous pulse times.

6. The control system of claim 4, wherein the crankshaft position filter module applies one of a time-based filter and a rotation-based filter to determine the previous pulse times.

7. The control system of claim 1, wherein the previous pulse times correspond to at least one of leading edges and trailing edges of the teeth.

8. The control system of claim 1, further comprising at least one of an air control module, a fuel control module, a spark control module, and an electric motor control module that control one of an engine and a transmission based on the present engine speeds.

9. The control system of claim 1, further comprising at least one of a misfire detection module and a torque estimation module that respectively detect engine misfire and estimate engine torque based on the present engine speeds.

10. The control system of claim 1, wherein:

the profile estimation module performs data fitting to determine the estimated profile every N engine rotations; and N is an integer greater than 1.

11. A method, comprising:

determining previous engine speeds based on a predetermined profile of a crankshaft position sensor and previous pulse times corresponding to teeth on the crankshaft position sensor;

performing data fitting to determine an estimated profile of the crankshaft position sensor based on the previous pulse times and the previous engine speeds;

determining present engine speeds based on the estimated profile and present pulse times corresponding to the teeth on the crankshaft position sensor; and controlling at least one of an engine and a transmission based on the present engine speeds.

12. The method of claim 11, further comprising determining adjusted engine speeds based on the previous pulse times and the estimated profile.

13. The method of claim 11, further comprising:

forming vectors representing the previous pulse times and the previous engine speeds; and performing linear least squares to determine the estimated profile.

14. The method of claim 11, further comprising filtering a crankshaft position signal generated by the crankshaft position sensor to determine the previous pulse times.

15. The method of claim 14, further comprising applying one of a low-pass filter and a band-pass filter to determine the previous pulse times.

16. The method of claim 14, further comprising applying one of a time-based filter and a rotation-based filter to determine the previous pulse times.

17. The method of claim 11, wherein the previous pulse times correspond to at least one of leading edges and trailing edges of the teeth.

18. The method of claim 12, further comprising controlling the at least one of the engine and the transmission based on the adjusted engine speeds.

19. The method of claim 11, further comprising at least one of detecting engine misfire and estimating engine torque based on the present engine speeds.

20. The method of claim 11, further comprising performing data fitting to determine the estimated profile every N engine rotations, wherein N is an integer greater than 1.

* * * * *